ELECTRICAL TRANSLATOR AND METHODS

Filed March 10, 1951 2 Sheets-Sheet 1

INVENTORS
BERNARD J. ROTHLEIN
FRIEDA A. STAHL
BY Paul S. Martin
ATTORNEY

Dec. 11, 1956 B. J. ROTHLEIN ET AL 2,773,925

ELECTRICAL TRANSLATOR AND METHODS

Filed March 10, 1951 2 Sheets-Sheet 2

INVENTOR
BERNARD J. ROTHLEIN
FRIEDA A. STAHL
BY Paul S. Martin
ATTORNEY

United States Patent Office 2,773,925

Patented Dec. 11, 1956

2,773,925

ELECTRICAL TRANSLATOR AND METHODS

Bernard J. Rothlein, Levittown, and Frieda A. Stahl, East Meadow, N. Y., assignors to Sylvania Electric Products Inc., a corporation of Massachusetts Application March 10, 1951, Serial No. 214,969

17 Claims. (Cl. 136—89)

The present invention relates to methods of processing germanium and to translators including photosensitive devices employing germanium.

It has been noted previously that highly purified germanium when treated with certain gases or when melted with a limited percentage of certain other metals constitutes a semiconductor having a relatively efficient rectification characteristic. A widely accepted "crystal" detector is made with a polished and etched piece of germanium taken from an ingot containing about 1% of tin, for example, cooled slowly from the molten state.

Certain germanium rectifiers have been found to be sensitive to radiation in the short infra-red region, but that sensitivity is relatively low and their resistance is quite high. One purpose of the present invention is to increase the photosensitivity of devices employing germanium. In another aspect the present invention aims at reducing the impedance of germanium photosensitive devices.

Quite apart from bulk effects, photosensitivity has been associated with inhomogeneity in the germanium, involving portions of P-type conductivity and portions of N-type conductivity with N–P barriers where these portions meet; or successive barriers (such as N–P–N or P–N–P) in more complex internal structures; and there is also the possibility of N–N barriers. The single types of conductivity, whether N-type or P-type, can be recognized from simple tests as by determining the behavoir of a specimen in a magnetic field (a characteristic known as the Hall effect). The different types are also recognized from their performance as rectifiers. The combinations of N and P type adjoining portions are recognized from the electrical characteristic, as a combination of N-type and P-type characteristics, and from the change of characteristic under changed conditions of temperature and more notably with changed lighting characteristics. A further object of the invention is to devise novel and more consistently successful methods for providing inhomogeneities in germanium, and to improve germanium devices whose performance depends upon inhomogeneities. A further aim is to produce one or more inhomogeneities in definite, predetermined positions on a specimen of germanium. A still further object is to increase the active area surrounding the contact of germanium devices.

A further feature of this invention is to produce a thinned region in a specimen of germanium that is inherently hard without resort to cutting or abrading. Another object is to provide novel cratered germanium translators, both photodetectors and others.

In several specific illustrative embodiments discussed below germanium devices of greatly improved photosensitivity and greatly reduced impedance are realized from germanium that is processed with zinc. The illustrative photosensitive units each includes a pointed wire in contact with a zinc-treated body of semiconductive germanium and a large-area "back" contact, although as pointed out in co-pending application Serial No. 147,736 filed March 4, 1950, by Rothlein and Stahl, in some instances the large contact as such is not indispensable and the second electrical connection can taken the form of a pointed wire.

The zinc-treated germanium results in a device of improved characteristics as described, but despite the requirement for zinc treatment for the improved characteristics, the zinc is not found in presently detectable amounts and therefore it cannot be certainly stated that zinc is present in the product.

The processing of N-type purified or doped germanium with zinc will be seen to take various useful forms; but in all, the zinc seems to function as a selective purgative or scavenger for traces of certain impurities and may leave traces of other impurities behind. It is also conceivable that an undetected trace of zinc remains and may contribute "acceptor" atoms to convert the affected portion of the germanium to P-type; or the zinc together with residual impurities may account for the results. These explanations are offered as aspects of the theory now considered plausible and not by way of limitation. In the illustrative procedures and products, N-type germanium is exposed to zinc at high temperatures, cooled slowly and then etched; and the germanium thus treated with zinc is seemingly converted to a different type of germanium by action of the zinc. The zinc, having a higher affinity for some impurities than for the germanium may function as a sort of metal etch or a leach, to convert the germanium thus affected from doped N-type germanium to a different type of germanium integral with the unaffected N-type germanium body portion.

It is not an indispensable condition that the germanium used for enhanced photosensitivity be a good N-type rectifier. Arsenic in barely detectable traces is regarded as a "poison" for high-resistance and high-efficiency rectifiers; yet arsenic-poisoned germanium when processed with zinc has yielded highly sensitive photodetectors.

The nature of the invention in its various aspects will be better appreciated from the following illustrative description read in connection with the accompanying drawings.

Figure 1:
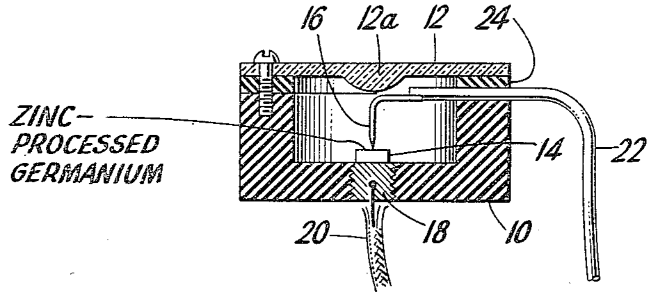
Figure 1 is the enlarged cross-sectional view of an illustrative form of phototranslator embodying features of the invention.

In Figure 1 a photosensitive electrical translator is shown having a hollow container 10 of insulating material having a light transmitting cover 12, the portion 12*a* of which is advantageously formed as a spherical lens for focusing incident radiation on the area of a body 14 of germanium immediately adjacent that where resilient contact or whisker 16 having a sharp end, is in contact with the body 14. Germanium body 14 is supported on a conductive plug 18 to which a terminal lead 20 is secured, and whisker 16 is supported on a lead 22 (to which it is welded or otherwise conveniently secured) and held in place by a ring 24. When assembling the device, the plug 18 with its lead 20 and germanium body 14 is inserted into body 10, and whisker 16 is brought into contact with the germanium and held in proper contact by ring 24 that is screwed or otherwise conveniently secured to body 10. Thereafter cover 12 is applied.

Figure 2:
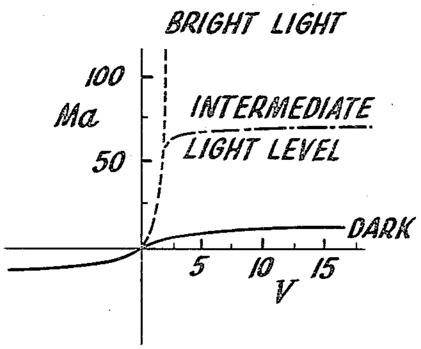
Figure 2 is one typical electrical characteristic thereof and Figures 3 and 3A show another typical characteristic thereof, Figure 3A being an enlarged portion of Figure 3.

With tin-doped N-type germanium, the type that is commonly used for rectifiers of the 1N34 detector class, a change of "back" current occurs when light is applied, in contrast to the dark current, having a ratio of 10 to 1. The light used in this test is an incandescent lamp of low wattage having a portion of its radiation focused on the point-contact area from a relatively remote position. As will be seen, the change in current that is most prominent with some zinc-treated N-type germanium, between "light" and "dark," is in the "forward" direction (in the sense of N-type rectification). When the semiconductive commercially pure or tin-doped germanium (for example) is treated with zinc, a ratio of current between "light" and "dark" of 100 to 1 is frequently realized, occasionally reaching 500 to 1. The change in current can be observed with a very low value of applied alternating voltage, for example, about 1.5 volts R. M. S. As shown in Figure 2, the forward "light" current of a typical specimen zinc-treated device exposed to about 3 watts of radiant energy from the incandescent test lamp per square centimeter rises steeply with increasing positive potential as shown by the dashed line. The slope of the curve indicates a dynamic resistance in the forward conducting region when exposed to light to be approximately 50 ohms. In the dark this form of characteristic is virtually symmetrical in the "front" and "back" directions of conductivity. It is not a rectifier except when light is directed at the contact region. The characteristic suggests the existence of series-opposed rectifiers, in the dark; and it also suggests that under the action of light the back resistance of one of the rectifiers drops to a very low value, at least for a limited range of applied voltage.

Figure 2 shows the curves obtained with different light intensities. At intermediate light level (about 1.0 watt per $cm.^2$) saturation develops at moderate values of applied voltage, whereas the saturation level is not reached for bright light (3.0 $watts/cm.^2$).

Figure 3:
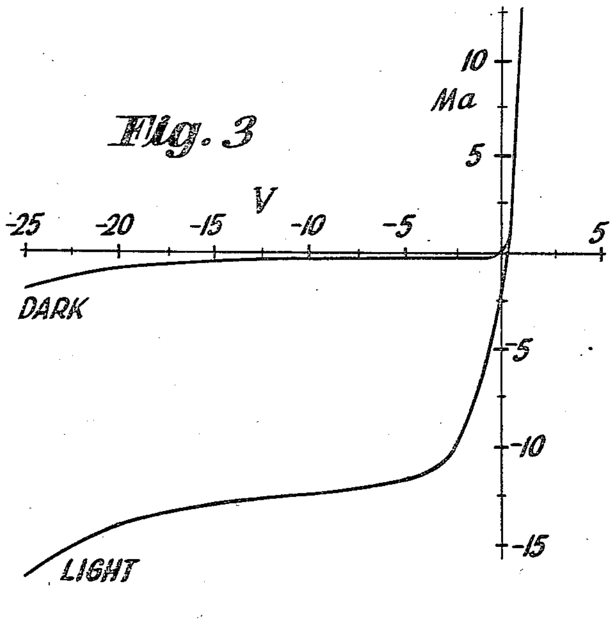
Figure 3A:
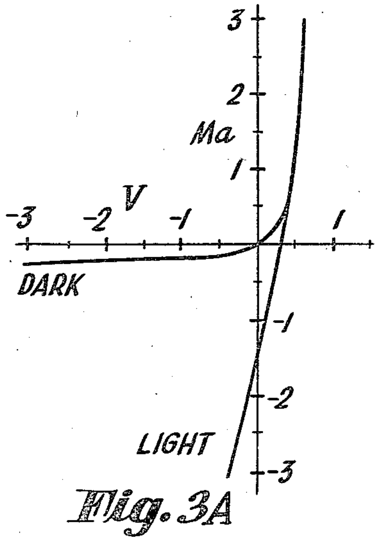

Another type of photosensitivity is represented in the characteristic of Figures 3 and 3A that is obtained in other samples of zinc-processed germanium. This characteristic is seen to have good rectifying properties in darkness, and it also has good rectification efficiency in light, but the "back" current is seen to increase very greatly when the contact region is exposed to light. For low values of applied voltage the back resistance in darkness is approximately 20,000 ohms, based on the slope of the curve, whereas the resistance in the back direction with light for very low values of applied voltage is approximately 250 ohms.

The wide change in resistance accompanied by the relatively large current change shows that the zinc processed germanium has a very high degree of photo-conductive sensitivity. As compared to the 1N34 tin-doped germanium diode adapted to function as a photoconductive device, the impedance of these novel units when exposed to the light is very low and in consequence they can be used directly in series with relays and the like of proper current snsitivity. In such applications the photoresponsive system is reduced to its elemental components: a source of potential, a photosensitive device in accordance with the present invention, and a relay or other suitable load.

In Figure 3A the "light" characteristic reveals a further interesting feature, namely, that a definite current is produced at zero volts applied; or, viewed otherwise, a substantial bucking voltage must be applied if zero current is to flow. This is recognizable as a photovoltaic effect, and is a valuable attribute of the device.

A limitation of photodetectors of high sensitivity is the random fluctuation of the "dark" current superimposed on the current component attributable to light.

The highly sensitive zinc-crater photovoltaic device is outstandingly free of such random fluctuations or "noise." This is because its "dark" current is zero, and as a result the device can be used in detecting extremely low light levels that would otherwise be masked by noise.

Lead sulphide has heretofore been used for infra-red detection, operating as a photo-conductive device. The novel photovoltaic germanium devices, because of their remarkable immunity to noise, can detect low levels of infra-red radiation, superior in this respect by a factor of 1000 as compared to lead sulphide.

The nature of the germanium that yields the outstanding photosensitivity is not fully understood and for this reason various procedures for preparing it, using zinc, are described in place of what perhaps would be the more direct way of describing the device, namely, by its composition. In three methods described, although the germanium is processed with zinc there is no detectable degree of zinc present in the final device even through careful spectroscopic analysis sensitive to one part of zinc in one million parts of germanium.

If commercially pure germanium is allowed to remain in a bath of molten zinc together with a doping substance (such as 1% tin in relation to the germanium) for a suitable period of time, of the order of hours, and above the melting temperature of germanium (960° C.) and then allowed to cool slowly, the germanium separates out into doped crystals that can be controlled in size according to the shallowness of the melt and the rate of cooling. Thereafter the crystals thus grown can be separated from the zinc by dissolving the latter, as in nitric acid; and finally the crystals can be etched for effective exposure to a sharp-ended contact element. The conventional aqueous mixture of HF, $HNO_3$ and $Cu(NO_3)_2$ is suitable as an etching solution, although other etching solutions can be used as in co-pending application Serial No. 106,493, filed July 23, 1949, by Frederick Koury. A large proportion of the crystals obtained can be used in devices as shown in Figure 1, some having the characteristics of the type in Figure 2 and others of the type in Figure 3. These characteristics demonstrate the integral assembly of inhomogeneous germanium in various states; and while the doping constituent is consistently revealed by spectrographic analysis, zinc is present in only incompletely leached and etched specimens. What conceivably occurs is that crystals are formed containing a doping constituent and constituting N-type semiconductors; but the zinc leaches the impurities from the surface portions of the germanium. The complex characteristics are unlike N-type or P-type semiconductors. Photosensitive devices made by the foregoing process are of generally low impedance in the dark, compared, for example, to the 1N34 rectifier; and in light this impedance drops by a factor of the order of 100. The electrical properties of such crystals vary over a considerable latitude, and the handling and mounting of these crystals is rendered difficult because of their brittleness.

Zinc can be used to advantage in the processing of commercially pure germanium to yield the inhomogeneous specimens completed (Figure 1) as photosensitive translators, in the practice usually followed in forming a "doped" melt, prolonging the molten state of the germanium sufficiently to reduce the zinc content to a level below spectroscopic detection. A cycle of 2 hours during which the germanium is molten, followed by gradual cooling to 800° C. in a five-hour period, followed by cooling over two hours longer, all in vacuum, produces an ingot having a high yield of inhomogeneous portions when sliced and etched. Some portions show pronounced photoresponse of the types in Figures 2 and 3, while others are of high impedance and excellent rectification efficiency comparable to or higher than that of the 1N34.

The zinc (1–5%) is added to the germanium, both substances in powdered form, by mixing these together; and the charge to be melted is advantageously formed with vertical bores for escape of vapors during the cycle, including zinc vapor. In conjecture, the zinc absorbs the impurities from the immediately contacted germanium, and this zinc and its absorbed impurity constituents are separated and driven off together as a vapor.

Another illustrative but specially advantageous method of producing photosensitive germanium using zinc can be carried out to yield the devices of Figures 4 to 9. The method yields less friable units than the grown crystals and in this respect is comparable to the second "melt" method described; but this method yields lower impedance photosensitive units than those obtained with the "melt" method and is more consistent and more readily controlled for the desired result than the other two procedures described.

Zinc granules of 30-mesh size, for example, are deposited at separate predetermined points on the surface of a slice of N-type germanium, such as a slice taken from an ingot containing 1% of tin. This is heated in air for about three hours, at a temperature between 600 and 800° C., above the melting point of zinc but below that of germanium, and thereafter cooled at about 50° C. per hour. During the furnace treatment the zinc does not wet the germanium, but remains stationary as a large number of beads, dwindling slightly in size. At the end of the furnace treatment there are numerous powdery spots on the germanium, and beads of zinc remain which are heavily contaminated with germanium and impurities originally present in the germanium. After brief treatment of the germanium slice first with a solvent for zinc such as nitric acid and then with a germanium etching solution such as the usual aqueous hydrofluoric acid, nitric acid and cupric nitrate etching bath, the powdery spots are changed into craters having unusually shiny facets even compared to the etched crystalline germanium around the craters and of prominent crystalline appearance (see Figures 5 and 6) when viewed with a low-power microscope.

Figures 4, 5, 6:
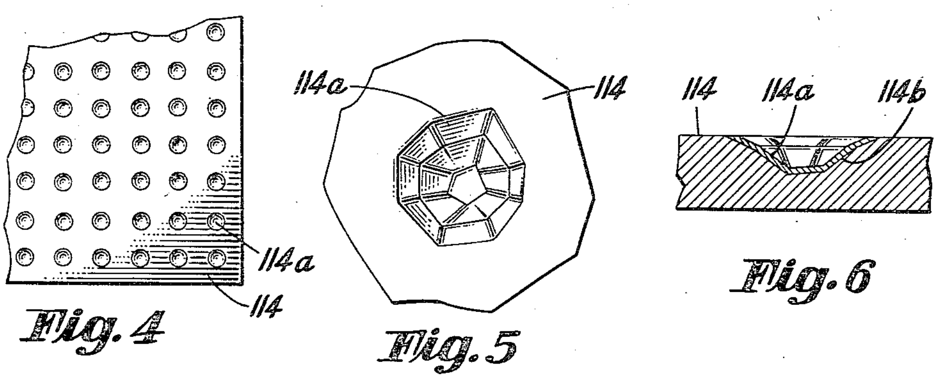
Figure 4 is an enlarged portion of a photo-mosaic embodying further aspects of the invention.
Figure 5 is a greatly magnified photosensitive area of the element in Figure 4
Figure 6 is a cross-sectional view of a portion thereof.

The zinc grains can be deposited regularly, so as to yield the form of mosaic 114 in Figure 4 wherein the circular areas 114*a* represent the inhomogeneities produced by the zinc treatment. Each area 114*a* exposed to the zinc has a magnified appearance much like that in Figure 5, and the area when shown in cross-section (Figure 6) is seen to be a crater, the bottom of which, according to its performance, is believed to have a layer 114*b* that is different from the bulk of the element 114, possibly of higher purity. The slice of germanium need not be properly doped and of the purity required for making high impedance rectifiers, for arsenic-poisoned material unsuitable for rectifiers is useful for making sensitive photodetectors according to this procedure. Commercially pure germanium as reduced from the oxide obtained from the Eagle-Picher Lead Company has been made into a single large crystal by techniques known to the art and without addition of any doping constituent, and a slice of such large N-type crystal has been treated with zinc as above with excellent formation of photosensitive craters.

The range of 600 to 800° C. has been indicated as suitable for producing photodetectors. However, the lower part of this range, about 630 to 680° C., shows a comparatively high yield of units functioning according to Figure 3A with a prominent photovoltaic effect, whereas the upper portion of the range, above 680° C., yields a high proportion of units functioning according to Figure 2.

Figure 7:
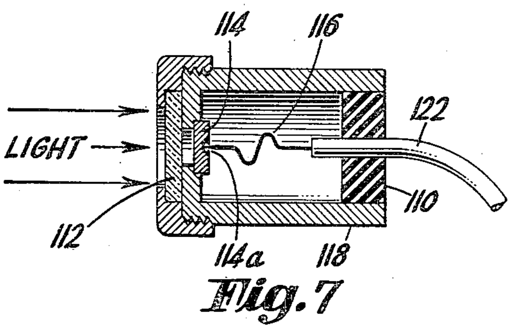
Figures 7 and 8 are enlarged cross-sectional views of a photodetector and a semiconductor amplifier, respectively, incorporating an elemental portion of the germanium in Figures 4 to 6.
Figure 8:
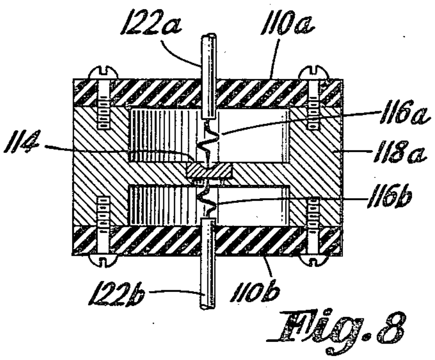
Figure 9:
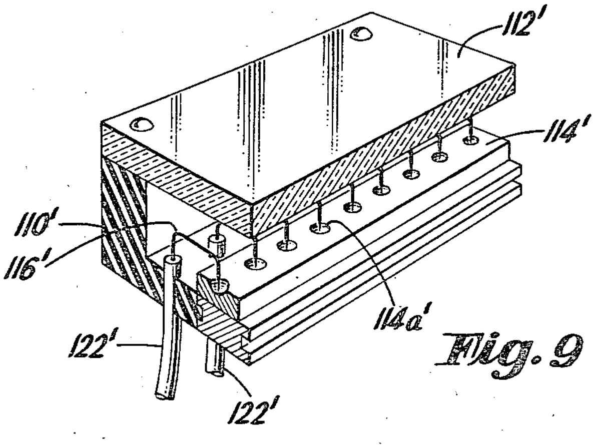
Figure 9 is an enlarged perspective view of a multiple photodetector embodying the photomosaic form of germanium in Figure 4.

The crater of Figure 6 adapts this form of device to function as a translator as in Figure 7, in which germanium body 114 carried by conductive support and terminal 118 is engaged within the crater by sharp contact 116 on lead 122 carried by insulator 110. Cover 112 of good efficiency in transmitting infra-red radiation protects the "crystal" 114; and the light incident on the germanium penetrates to the zinc-processed crater. The crater-type photodetector can, however, be constructed much as in Figure 1, without having the light penetrate the germanium. Additionally, the craters can be used in multiple, as shown in Figure 9, constituting a compact multiple sensing element for the columns of perforated record cards. In Figure 9, primed numerals are used corresponding to Figure 7.

A large area around the sharp-ended contact that is obtainable with the zinc-treated germanium device participates in the photodetection, as compared to the smaller active area around point-contact of the usual tin-doped rectifier when used as a photodetector. This is an advantage in that it requires less critical adjustment than former germanium photodetectors.

The foregoing process of exposing the surface of an N-type body of germanium to the zinc treatment while the body retains its form has the foregoing advantages of controlled characteristic (photoconductive or photovoltaic), large active area around the contact, low impedance as compared to tin-doped rectifiers, and location of photosensitive areas in predetermined locations, but is especially notable for high yield of desirable units.

The crater produced by the zinc treatment can also be used to advantage in constructing semiconductor amplifiers as of the type in co-pending application Serial No. 41,785 filed July 31, 1948, by Harold Heins. An illustrative form appears in Figure 8, where the germanium is reduced in thickness at the crater sufficiently to enable the fields of sharp contacts 116*a* and 116*b* to produce an interaction so as to amplify signals applied to the germanium by one electrode, with the signal derived by a load connected to the other. An additional contact 118*a* of large area is also provided as the return connection for the input and output circuits connected to leads 122*a* and 122*b* of the sharp contacts. The supports 110*a* and 110*b* for contacts 116*a* and 116*b* should be opaque so as to protect the device from random light effects. In this case the photosensitivity is a characteristic of the germanium that is not used. However, germanium is extremely hard; so that this process for forming a thinned region without machining is of special value.

The "zinc" crater is of further advantage in multicontact amplifiers, even were the point-contacts arranged all on the same side, because of the comparatively lower precision required in positioning the additional point-contact element in relation to a sharp-ended contact in the crater. The operation of the usual multicontact amplifier is relatively critically dependent on the spacing between the contacts; but this spacing is much less critical in zinc-crater type amplifiers.

A variety of processes have been described for treating germanium with zinc for outstanding photosensitivity and other novel results, and the resulting products have unique properties. The illustrative disclosure will naturally be found susceptible to a latitude of modification and varied application, so that it is appropriate that the appended claims be accorded a latitude of interpretation consistent with the spirit and scope of the invention.

What is claimed is:

1. An electrical translator including a body of semiconductive germanium having a crater produced by exposing the surface of a solid body of semiconductive germanium to the action of zinc at 600 to 800° centigrade and etched after gradual cooling.

2. An electrical translator including a body of semiconductive germanium having a mosaic of separated glassy-surfaced areas of high sensitivity.

3. An electrical translator including a body of semiconductive germanium having a mosaic of regularly distributed photosensitive inhomogeneities.

4. An electrical translator including a body of semiconductive germanium having a mosaic of regularly distributed photosensitive inhomogeneities produced by the action of zinc at 600 to 800° C. on a solid body of germanium followed by gradual cooling and etching.

5. An electrical translator including a body of semiconductive germanium having a localized inhomogeneity produced by exposing solid germanium to a zinc granule at 600 to 800° C., cooling gradually and etching, a first sharp contact engaging said inhomogeneity, an additional sharp contact engaging said body close enough to said first contact to effect electrical interaction, and an additional contact of large area engaging said germanium body.

6. A photo-conductive germanium translator including a germanium body produced by a process including the step of exposing solid semiconductive germanium to the action of zinc at a temperature in the range 680 to 800° centigrade, cooling the germanium, and removing the reaction products of the zinc from the germanium with a chemical etch.

7. The method of producing photo-detectors including the steps of exposing a solid body of purified germanium to the action of zine above the melting temperature of zinc but below the melting temperature of the germanium.

8. The method of producing photo-detectors including the steps of exposing doped germanium to the action of zinc above the melting temperature of zinc but below the melting temperatures of the doped germanium.

9. The method of producing photo-detectors including the steps of exposing N-type germanium to the action of zinc above the melting temperature of zinc while the germanium is maintained in solid state.

10. The method of producing a localized inhomogeneity in germanium including the steps of exposing the surface of a body of germanium to the action of a granule of zinc at a temperature in the range 600 to 800° centigrade, gradually cooling the germanium body and etching the germanium to remove reaction products of the zinc and the germanium.

11. The method of producing localized inhomogeneities in germanium including the steps of exposing the surface of a body of germanium simultaneously to the action of a plurality of granules of zinc located on the germanium in a desired pattern at a temperature in the range 600 to 800° centigrade, gradually cooling the germanium body and etching the germanium to remove reaction products of the zinc and the germanium.

12. The method of producing photo-voltaic germanium including the steps of exposing N-type germanium to the action of surface-deposited zinc at a temperature in the range 630 to 680° centigrade, gradually cooling the germanium, and removing reaction products of the zinc from the germanium with a chemical etch.

13. The method of producing localized inhomogeneities in a semi-conductor including the steps of depositing on the semi-conductor a discrete amount of a metal whose melting temperature is below that of the semi-conductor, and exposing the deposited metal and the semi-conductor to prolonged heat treatment above the melting temperature of the metal but below that of the semi-conductor.

14. An electrical translator including a body of semi-conductor having an etch-pit crater, a sharp contact in said crater, and a further contact on said body.

15. The process of modifying the surface of a body of semi-conductive germanium to produce a localized inhomogeneity therein, including the steps of heating the germanium below its melting point with a droplet of a metal etchant in molten state thereon cooling the thus treated germanium, and chemically etching away the metal etchant to reveal an etch-pit crater.

16. The method in accordance with claim 15, including additionally the step of engaging this crater with a sharp contact and fixing the contact in such engagement.

17. The method of treating germanium to provide a mosaic thereon, which includes the steps of assembling grains of metal on the germanium in desired distribution, reacting the grains with the germanium at a temperature above the melting point of the treating metal but below that of germanium, and chemically removing at least the bulk of the assembled metal.

References Cited in the file of this patent

UNITED STATES PATENTS

| | | |
|---|---|---|
| 817,664 | Plecher | Apr. 10, 1906 |
| 2,504,628 | Benzer | Apr. 18, 1950 |
| 2,514,879 | Lark-Horowitz et al. | July 11, 1950 |
| 2,560,606 | Shive | July 17, 1951 |